United States Patent
Ji et al.

(10) Patent No.: US 12,422,986 B2
(45) Date of Patent: Sep. 23, 2025

(54) STORAGE DEVICE PROGRAMMING TARGET DUMMY DATA IN TARGET MEMORY UNIT AND OPERATING METHOD OF THE STORAGE DEVICE

(71) Applicant: SK hynix Inc., Icheon (KR)

(72) Inventors: Seung Gu Ji, Icheon (KR); Dong Hwan Kim, Icheon (KR); Dae Seok Shin, Icheon-si (KR); Dong Jae Shin, Icheon (KR)

(73) Assignee: SK hynix Inc., Icheon (KR)

( * ) Notice: Subject to any disclaimer, the term of this patent is extended or adjusted under 35 U.S.C. 154(b) by 23 days.

(21) Appl. No.: 18/489,484

(22) Filed: Oct. 18, 2023

(65) Prior Publication Data
US 2024/0411454 A1    Dec. 12, 2024

(30) Foreign Application Priority Data
Jun. 7, 2023    (KR) .......................... 10-2023-0072554

(51) Int. Cl.
*G06F 3/06* (2006.01)
(52) U.S. Cl.
CPC .......... *G06F 3/0611* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2015/0332770 A1* | 11/2015 | Kim | G11C 16/20 365/185.12 |
| 2019/0227926 A1* | 7/2019 | Ke | G06F 12/0253 |
| 2021/0026738 A1 | 1/2021 | Lin | |
| 2022/0115082 A1* | 4/2022 | Ock | G11C 16/225 |
| 2024/0233813 A1* | 7/2024 | Guo | G11C 16/26 |

FOREIGN PATENT DOCUMENTS

KR    1020150130638 B1    11/2015

\* cited by examiner

*Primary Examiner* — Edward J Dudek, Jr.
*Assistant Examiner* — Ralph A Verderamo, III

(57) ABSTRACT

A storage device may determine a target memory block from among a plurality of memory blocks, determine a target memory unit from among the plurality of memory units included in the target memory block, and program target dummy data into the target memory unit when it is determined that the target dummy data is not programmed into the target memory unit and when the program operation for the target memory unit is not yet completed.

13 Claims, 10 Drawing Sheets

STORAGE DEVICE PROGRAMMING TARGET DUMMY DATA IN TARGET MEMORY UNIT AND OPERATING METHOD OF THE STORAGE DEVICE

CROSS-REFERENCES TO RELATED APPLICATION

The present application claims priority under 35 U.S.C. 119 (a) to Korean patent application number 10-2023-0072554 filed in the Korean Intellectual Property Office on Jun. 7, 2023, which is incorporated herein by reference in its entirety.

BACKGROUND

1. Technical Field

Various embodiments generally relate to a storage device programming target dummy data in a target memory unit, and an operating method thereof.

2. Related Art

A storage device is a device which stores data on the basis of a request of an external device such as a computer, a mobile terminal such as a smartphone or a tablet, or any of various electronic devices.

The storage device may include a controller for controlling a memory (e.g., a volatile memory/a nonvolatile memory). The controller may receive a command from the external device, and may execute or control an operation for reading, writing, or erasing data with respect to the memory included in the storage device, on the basis of the received command.

Meanwhile, the storage device may determine whether data stored in a specific location in the memory is valid at a specific time point. In this case, it may take a long time to determine whether the data stored in the specific location is valid or not, and overhead of the storage device may increase.

SUMMARY

Embodiments of the disclosure are directed to a storage device capable of reducing the time required to determine validity of data programmed into a target memory unit and quickly determining whether to program target dummy data in the target memory unit or not, and to an operating method of the storage device.

In one aspect, embodiments of the disclosure may provide a storage device including i) a memory including a plurality of memory blocks, each of the plurality of memory blocks including a plurality of memory units, each of the plurality of memory units corresponding to a corresponding one of a plurality of word lines and including a plurality of memory cells, and each of the plurality of memory cells having an erase state or one of N program states, and ii) a controller configured to determine a target memory block from among the plurality of memory blocks, determine a target memory unit from among the plurality of memory units included in the target memory block, and program target dummy data into the target memory unit when it is determined that the target dummy data is not programmed into the target memory unit and when a program operation for the target memory unit is not completed.

In another aspect, embodiments of the disclosure may provide an operating method of a storage device including i) determining a target memory block from among a plurality of memory blocks, each including a plurality of memory units, ii) determining a target memory unit from among the plurality of memory units included in the target memory block, iii) determining whether the target memory unit satisfies a reference condition, and iv) programming target dummy data into the target memory unit when the target memory unit satisfies the reference condition. Each of the plurality of memory units included in the target memory block may correspond to a corresponding one of a plurality of word lines and may include a plurality of memory cells, and each of the plurality of memory cells may have an erase state or one of N program states. And the reference condition may be satisfied when the target dummy data is not programmed into the target memory unit and when a program operation for the target memory unit is not yet completed.

In another aspect, embodiments of the disclosure may provide a storage device including i) a working memory storing target dummy data, and ii) a processor configured to execute operations instructing: determining a target memory block from among a plurality of memory blocks, each including a plurality of memory units, determining a target memory unit that is the last programmed memory unit among the plurality of memory units included in the target memory block before Sudden Power Off (SPO) occurs, and programming target dummy data into the target memory unit when the target dummy data is not programmed into the target memory unit and when a program operation for the target memory unit is not yet completed.

According to embodiments of the present disclosure, it is possible to reduce the time required to determine the validity of data programmed into the target memory unit and quickly determine whether to program the target dummy data in the target memory unit or not.

DETAIL DESCRIPTION OF THE EXEMPLARY EMBODIMENTS

Figure 1:
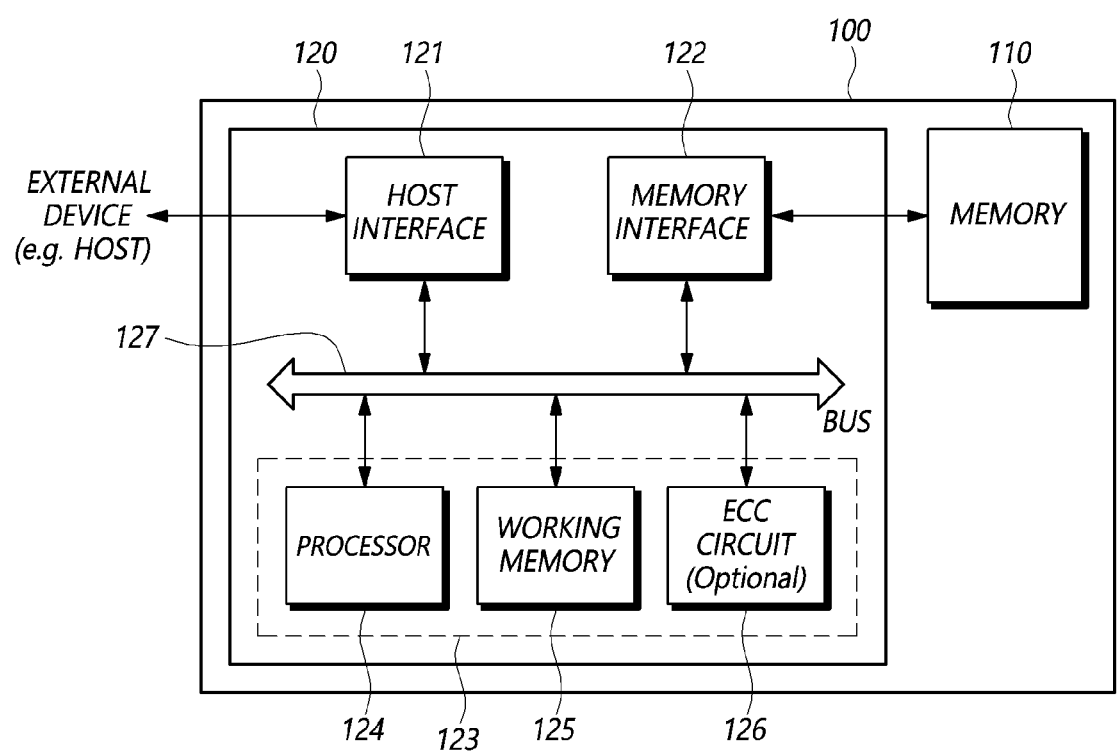
FIG. 1 illustrates a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 illustrates a storage device 100 according to an embodiment of the present disclosure.

Referring to FIG. 1, the storage device 100 may include a memory 110 that stores data and a controller 120 that controls the memory 110.

The memory 110 includes a plurality of memory blocks, and operates under the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g. SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
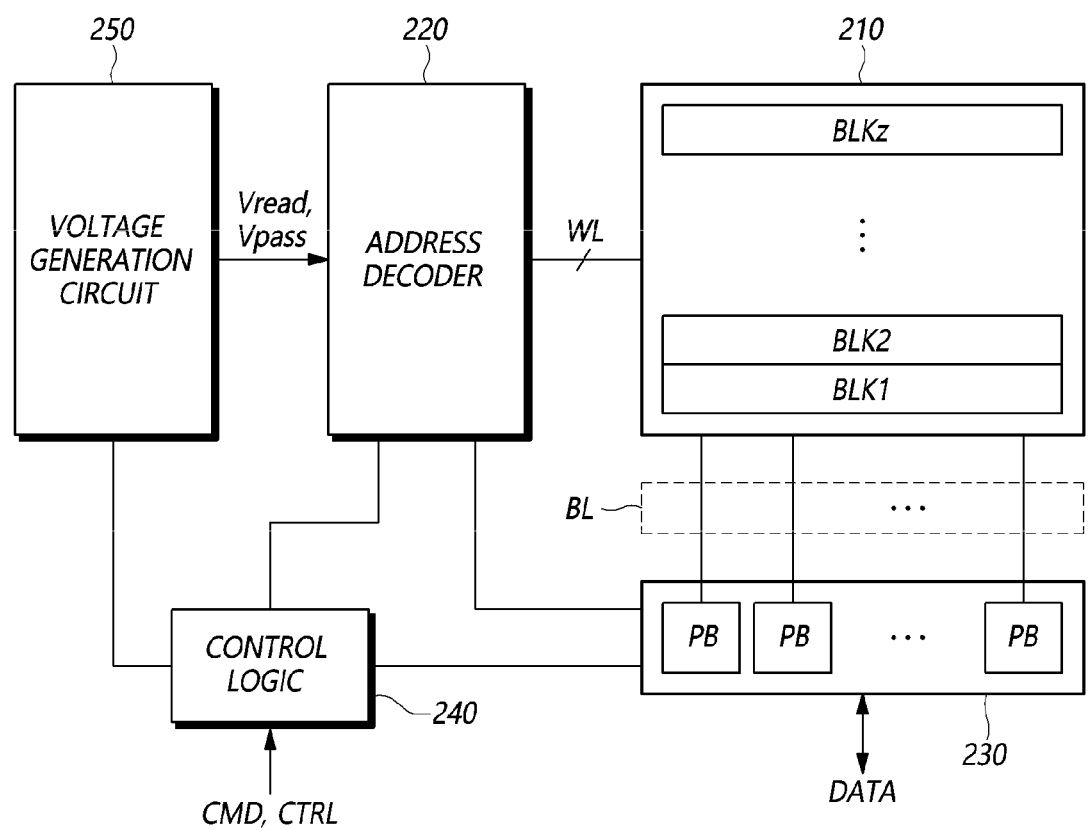
FIG. 2 is a block diagram schematically illustrating a memory of FIG. 1.

FIG. 2 is a block diagram schematically illustrating the memory 110 of FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
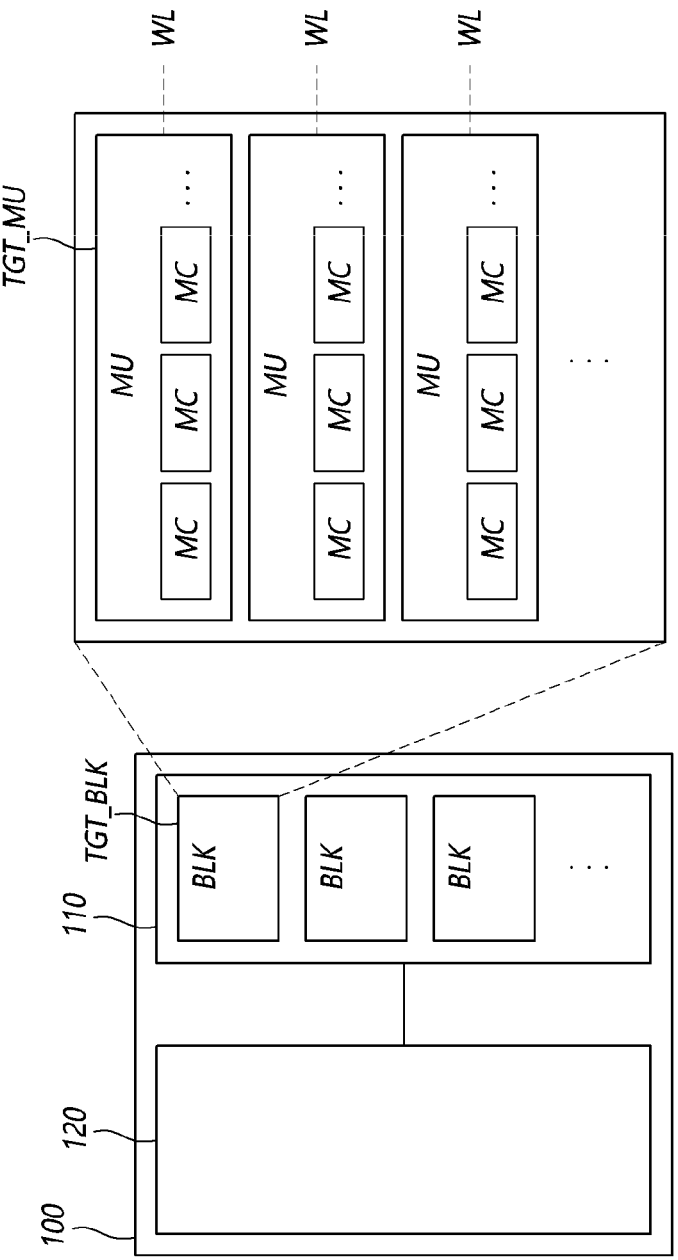
FIG. 3 illustrates a storage device according to an embodiment of the present disclosure.

FIG. 3 illustrates a storage device 100 according to an embodiment of the present disclosure.

Referring to FIG. 3, the storage device 100 may include a memory 110 and a controller 120.

The memory 110 may include a plurality of memory blocks BLK. Each of the plurality of memory blocks BLK may include a plurality of memory units MU. Each memory unit MU may include one or more pages.

Each of the plurality of memory units MU may correspond to one of a plurality of word lines WL, and may include a plurality of memory cells MC. A plurality of memory units MU included in the same memory block may correspond to different word lines, respectively.

Each of the plurality of memory cells MC may be in an erase state or one of N (N is a natural number) program states. For example, when the plurality of memory cells MC are single-level cells, each single-level cell may be in an erase state or a single program state. As another example, when the plurality of memory cells MC are multi-level cells, each multi-level cell may be in an erase state or one of 3 program states. As another example, when the plurality of memory cells MC are triple-level cells, each triple-level cell may be in an erase state or one of 7 program states.

The controller 120 may determine a target memory block TGT_BLK among the plurality of memory blocks BLK, determine a target memory unit TGT_MU among a plurality of memory units MU included in the target memory block TGT_BLK, and determine whether to program target dummy data into the target memory unit TGT_MU. The controller 120 may program the target dummy data into the target memory unit TGT_MU to prevent overwriting of the target memory unit TGT_MU and to prevent disturbance caused by an incomplete program operation in the target memory unit TGT_MU.

Meanwhile, the target dummy data may be stored in a working memory (e.g., working memory 125 shown in FIG. 1) in the controller 120.

In the embodiment of the present disclosure, the controller 120 may program the target dummy data into the target memory unit TGT_MU when it is determined that the target dummy data has not been programmed into the target memory unit TGT_MU and when a program operation for the target memory unit TGT_MU is not yet completed. Meanwhile, a processor (e.g., processor 124 shown in FIG. 1) of the controller 120 may execute operations instructing the programming of the target dummy data into the target memory unit TGT_MU.

Hereinafter, the above operation will be described in more detail with reference to FIG. 4.

Figure 4:
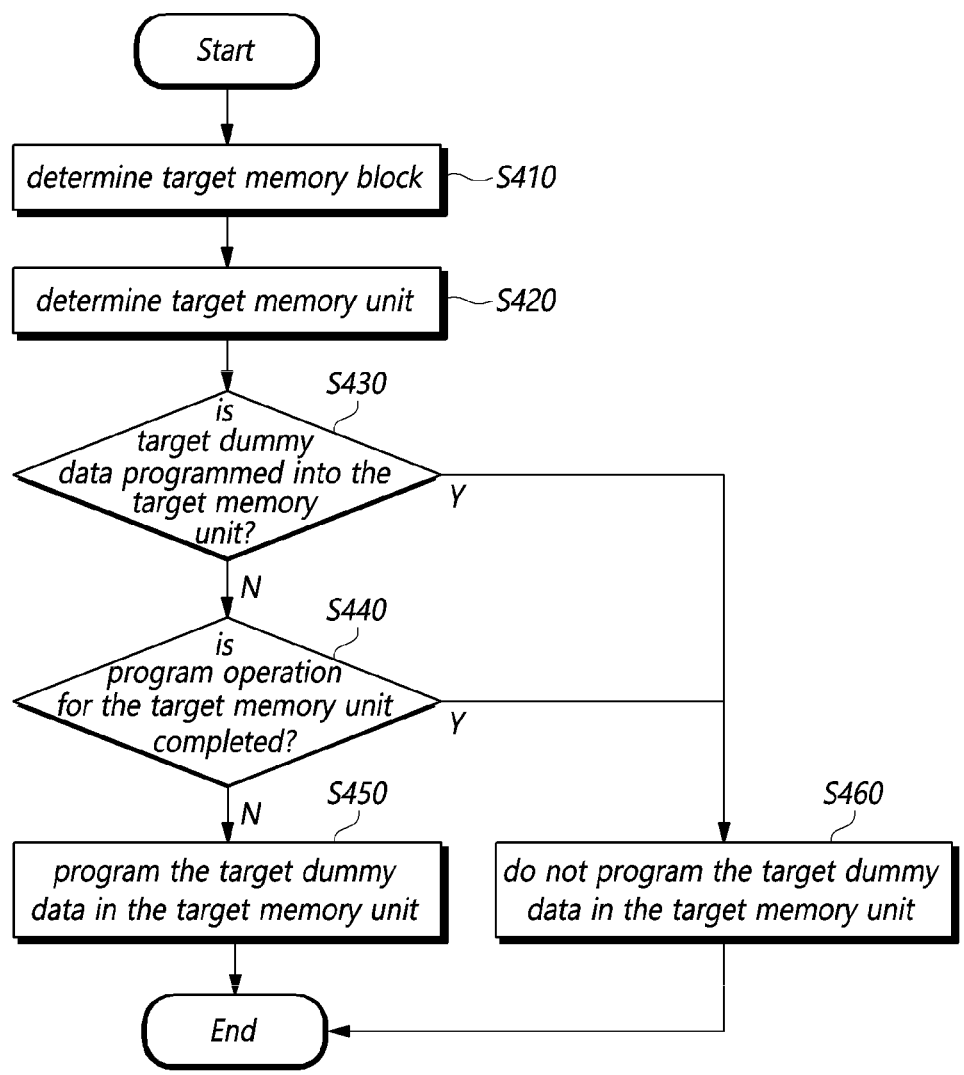
FIG. 4 illustrates a flowchart illustrating an operation of a storage device according to an embodiment of the present disclosure.

FIG. 4 is a flowchart illustrating an operation of a storage device according to an embodiment of the present disclosure. The operation illustrated in FIG. 4 will be described with reference to FIG. 3.

Referring to FIGS. 3 and 4, the controller 120 of the storage device 100 may determine the target memory block TGT_BLK from among the plurality of memory blocks BLK in the memory 110 (S410).

For example, the target memory block TGT_BLK may be a memory block in which a recovery operation for Sudden Power Off (SPO) is executed. When the SPO occurs in the storage device 100 and the storage device 100 is booted up after the SPO, the storage device 100 may execute the recovery operation for the SPO.

When the SPO occurs, a program operation may be interrupted in an open memory block among the plurality of memory blocks BLK where the program operation is being executed. At this time, data stored in a memory unit last programmed in the open memory block before the SPO occurs may become unstable. Accordingly, the controller 120 needs to determine the open memory block as the target memory block TGT_BLK and ensure reliability of data stored in the determined target memory block TGT_BLK.

The controller 120 may determine the target memory unit TGT_MU from among the memory units MU included in the target memory block TGT_BLK that has been determined at S410 (S420).

After that, the controller 120 may determine whether the target dummy data is programmed into the target memory unit TGT_MU (S430). When it is determined that the target dummy data has not been programmed into the target memory unit TGT_MU (S430-N), the controller 120 may determine whether the program operation for the target memory unit TGT_MU has been completed (S440).

When it is determined that the program operation for the target memory unit TGT_MU is not completed (S440-N), the controller 120 may program the target dummy data into the target memory unit TGT_MU (S450).

Through this, the controller 120 can determine whether to program the target dummy data into the target memory unit TGT_MU more quickly. This is because, during a process of reading incompletely programmed data from the target memory unit TGT_MU, it is possible to eliminate overhead of determining the validity of the read data and executing error correction if necessary.

On the other hand, when it is determined that the target dummy data has been programmed in the target memory unit TGT_MU (S430-Y) or when it is determined that the program operation for the target memory unit TGT_MU has been completed (S440-Y), the controller 120 may not program the target dummy data into the target memory unit TGT_MU (S460).

Hereinafter, the operations of the storage device 100 described with reference to FIG. 4 will be described in more detail with reference to FIG. 5.

Figure 5:
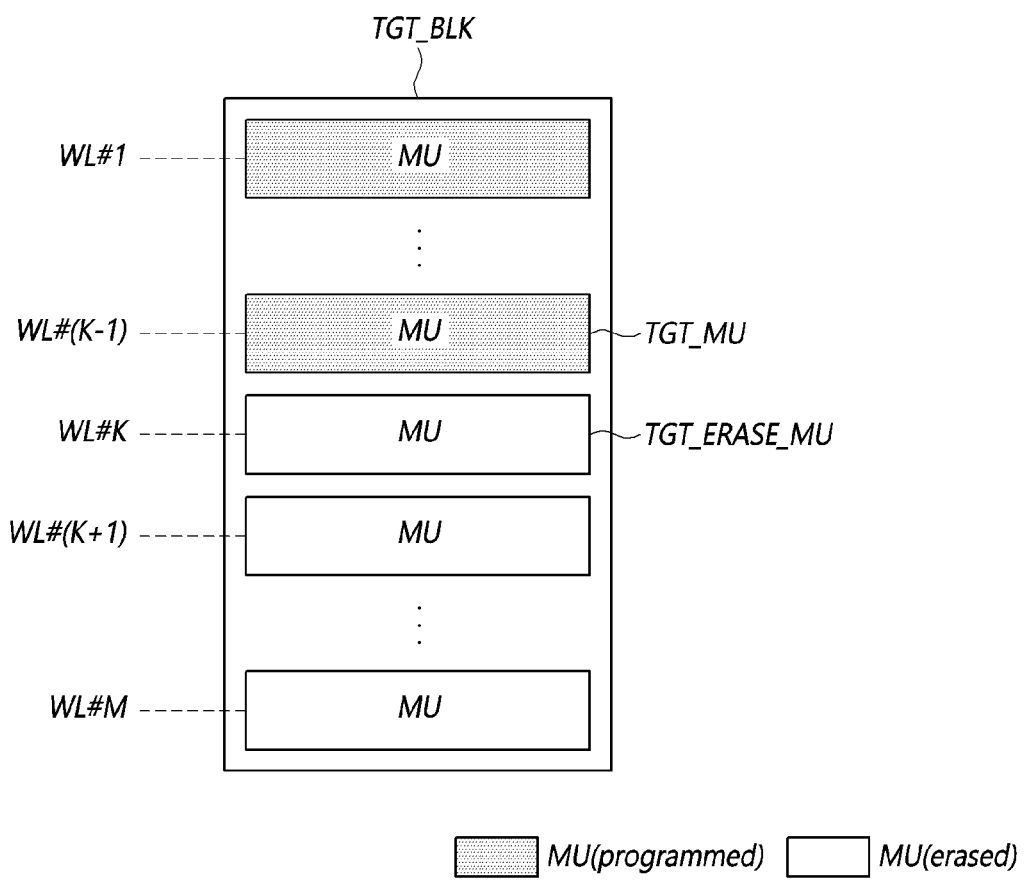
FIG. 5 illustrates an operation in which a storage device determines a target memory unit according to an embodiment of the present disclosure.

FIG. 5 illustrates an operation in which the storage device 100 of FIG. 3 determines the target memory unit TGT_MU according to an embodiment of the present disclosure.

Referring to FIG. 5, the target memory block TGT_BLK may include M memory units MU, M being equal to or greater than 2. The M memory units MU may correspond to M word lines WL #1 to WL #N, respectively. And the M word lines WL #1 to WL #N may correspond to indexes #1 to #N, respectively. The indexes #1 to #N of the M word lines WL #1 to WL #N may be used to determine priorities for programming the M memory units MU. For example, when data is programmed into the M memory units MU, the data may be programmed first in a memory unit having a higher priority.

However, specific values of indexes corresponding to the M word lines WL #1 to WL #N are not limited to the embodiment of FIG. 5.

When programming data in the target memory block TGT_BLK, the controller 120 of the storage device 100 may determine the order in which the data is programmed into the M memory units MU based on indexes of corresponding word lines. For example, the controller 120 may program data from a memory unit corresponding to the uppermost word line to a memory unit corresponding to the lowermost word line, following the ascending order of the indexes #1 to #N of the word lines WL #1 to WL #N.

The controller 120 may first determine a target memory erase unit TGT_ERASE_MU in order to determine the target memory unit TGT_MU. The target erase memory unit TGT_ERASE_MU may be determined as a memory unit having the highest program priority among erased memory units included in the target memory block TGT_BLK.

When a program operation for a memory unit MU is executed according to the ascending order of the corresponding index, the target erase memory unit TGT_ERASE_MU may be determined as a memory unit having the lowest word line index among erased memory units included in the target memory block TGT_BLK. Meanwhile, the target erase memory unit TGT_ERASE_MU may also be referred to as a first erase memory unit.

The controller 120 may use a binary search technique to search for the target erase memory unit TGT_ERASE_MU. The controller 120 may read a memory unit located in the middle between a memory unit with the lowest index and a memory unit with the highest index in the target memory block TGT_BLK.

The controller 120 may set the memory unit located in the middle as a memory unit with a new uppermost index if the memory unit is in an erase state, and as a memory unit with a new lowermost index if the memory unit is in a program state. The controller 120 may perform a new search for a memory unit located in the middle based on the memory unit with the new uppermost index and the memory unit with the new lowermost index. It will repeat this operation until the memory unit in the middle converges to the first erase memory unit.

In FIG. 5, erase memory units correspond to word lines WL #K, WL #(K+1), . . . , WL #M, respectively, where K is a natural number less than or equal to M. The target erase memory unit TGT_ERASE_MU is determined as the erase memory unit corresponding to the word line WL #K with the smallest index among all the erase memory units in the target memory block TGT_BLK After searching for the target erase memory unit TGT_ERASE_MU, the controller 120 may determine a memory unit preceding the target erase memory unit TGT_ERASE_MU as the target memory unit TGT_MU. The memory unit preceding the target erase memory unit TGT_ERASE_MU is a memory unit corresponding to the previous word line of the word line corresponding to the target erase memory unit TGT_ERASE_MU.

In FIG. 5, the controller 120 may determine, as the target memory unit TGT_MU, a memory unit corresponding to the word line WL #(K−1), which is a memory unit preceding the target erase memory unit TGT_ERASE_MU.

Figure 6:
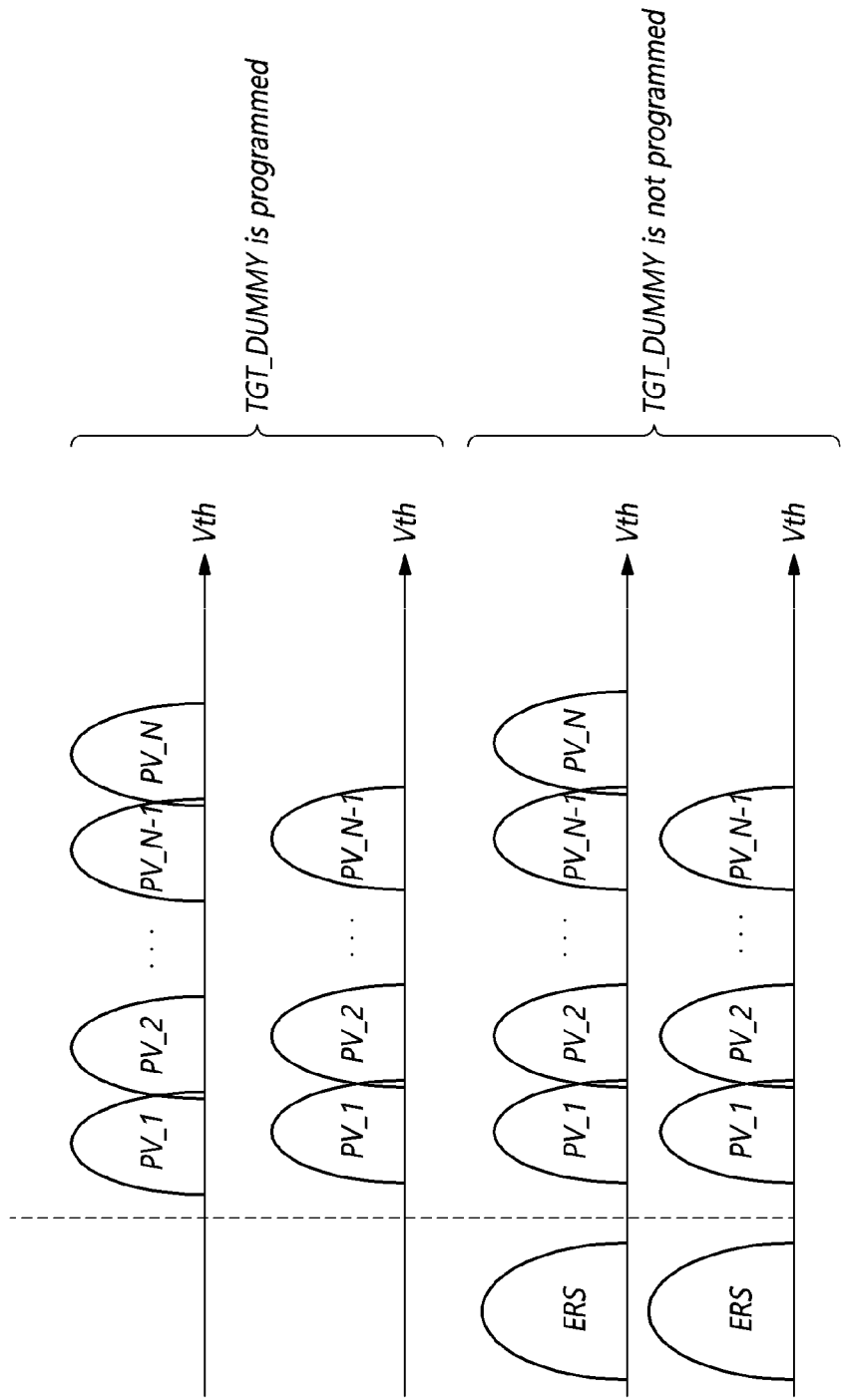
FIG. 6 illustrates an operation in which a storage device determines whether to program target dummy data into a target memory unit according to an embodiment of the present disclosure.

FIG. 6 illustrates an operation in which a storage device determines whether target dummy data is programmed into a target memory unit according to an embodiment of the present disclosure. The operation illustrated in FIG. 6 will be described with reference to the storage device 100 shown in FIG. 3.

Referring to FIG. 6, the controller 120 of the storage device 100 may determine that target dummy data TGT_DUMMY is programmed into the target memory unit TGT_MU when there is no memory cell in an erase state ERS among memory cells included in the target memory unit TGT_MU.

For example, when each of states of all the memory cells included in the target memory unit TGT_MU corresponds to one of the N program states PV_1, PV_2, . . . , PV_N−1, and PV_N, the controller 120 may determine that the target dummy data TGT_DUMMY is programmed into the target memory unit TGT_MU.

However, even though it is determined that the target dummy data TGT_DUMMY is programmed into the target memory unit TGT_MU, it is possible that among the memory cells included in the target memory unit TGT_MU, there may not be a memory cell with a specific program state among the N program states PV_1, PV_2, . . . , PV_N−1, and PV_N. For example, among the memory cells included in the target memory unit TGT_MU, there may not be a memory cell with the program state PV_N.

On the other hand, when there is at least one memory cell in an erase state ERS among the memory cells included in the target memory unit TGT_MU, the controller 120 may determine that the target dummy data TGT_DUMMY is not programmed into the target memory unit TGT_MU, regardless of the number of memory cells having one of the N program states PV_1, PV_2, . . . , PV_N−1, and PV_N.

Figure 7:
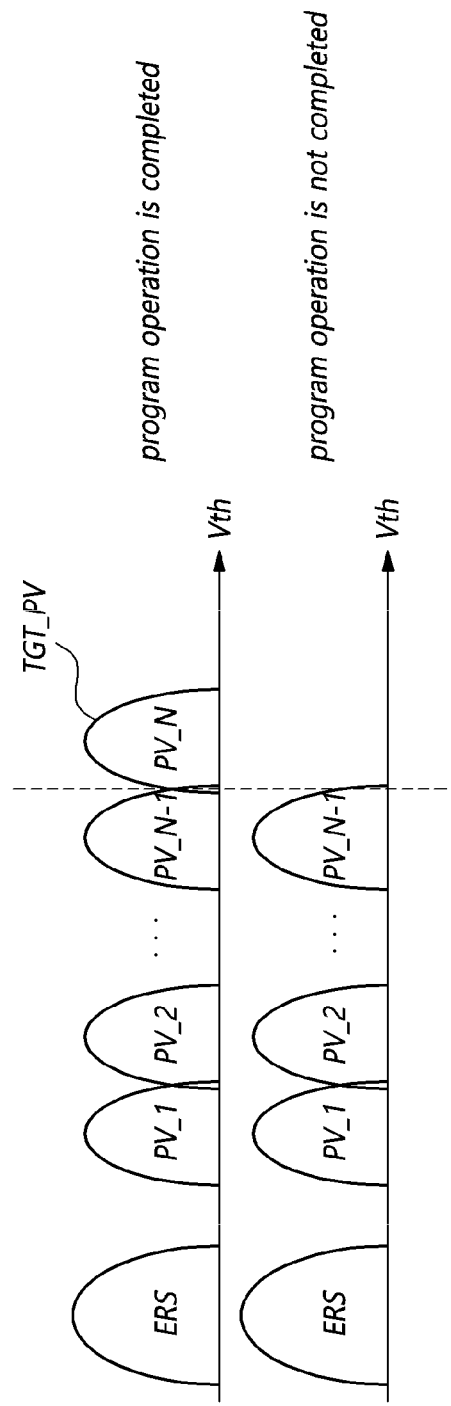
FIG. 7 illustrates an operation in which a storage device determines whether a programming operation for a target memory unit is completed according to an embodiment of the present disclosure.

FIG. 7 illustrates an operation in which a storage device determines whether a program operation for a target memory unit is completed according to an embodiment of the present disclosure. The operation illustrated in FIG. 7 will be described with reference to the storage device 100 shown in FIG. 3.

Referring to FIG. 7, the controller 120 of the storage device 100 may determine that the program operation for the target memory unit TGT_MU is not yet completed when there is no memory cell in a target program state TGT_PV among the N program states PV_1, PV_2, . . . , PV_N−1, PV_N, in the memory cells included in the target memory unit TGT_MU.

For example, the target program state TGT_PV may correspond to a program state among the N program states PV_1, PV_2, . . . , PV_N−1, and PV_N, which has the highest threshold voltage level. In FIG. 7, the target program state TGT_PV may be the program state PV_N.

In FIG. 7, the controller 120 may determine that the program operation for the target memory unit TGT_MU is completed when there is a memory cell within the target memory unit TGT_MU that has the program state PV_N, which corresponds to the target program state TGT_PV. On the other hand, the controller 120 may determine that the program operation for the target memory unit TGT_MU is not yet completed when there is no memory cell within the target memory unit TGT_MU that have the program state PV_N.

Figure 8:
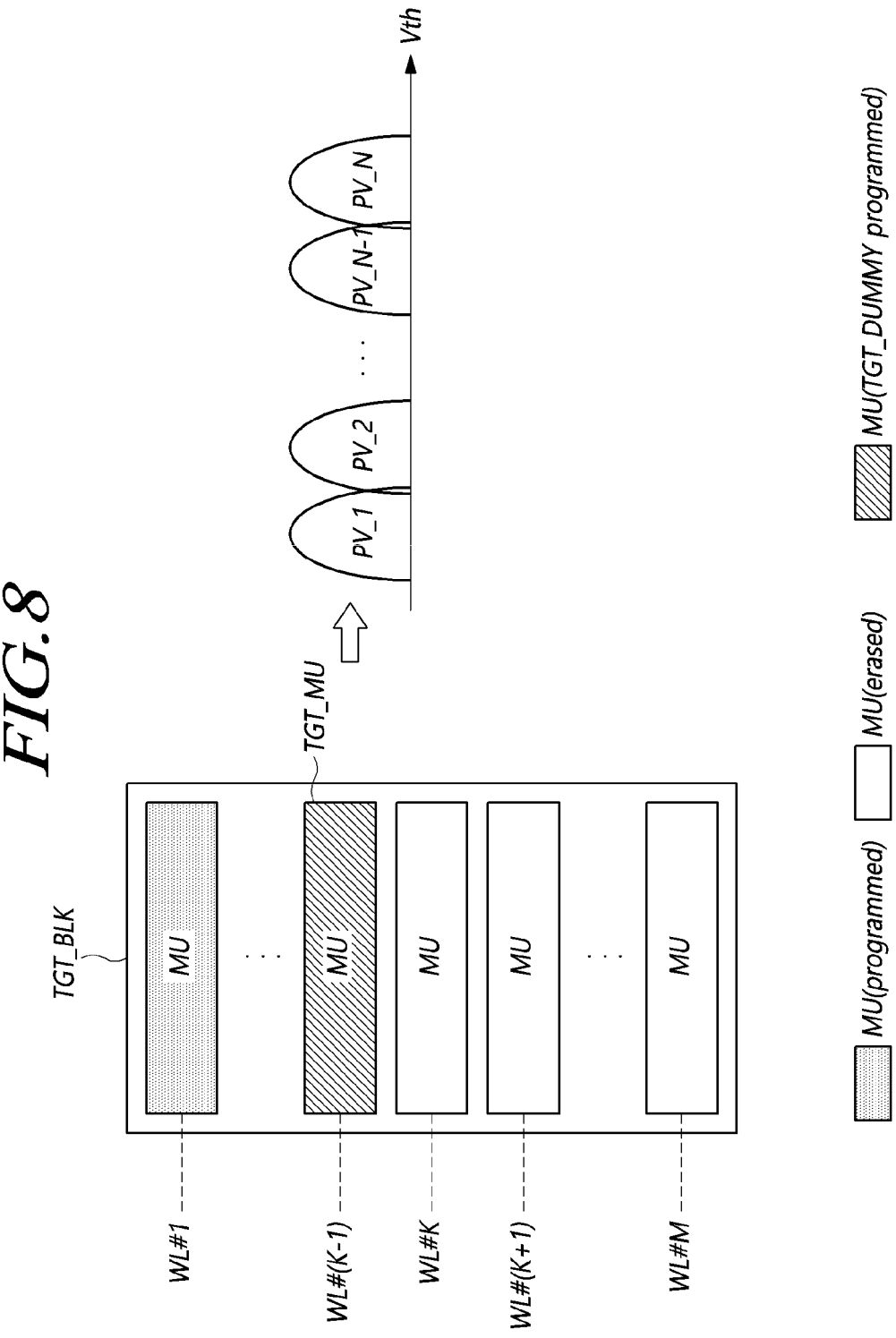
FIG. 8 illustrates an operation in which a storage device programs target dummy data into a target memory unit according to an embodiment of the present disclosure.

FIG. 8 illustrates an operation in which a storage device programs target dummy data into a target memory unit according to an embodiment of the present disclosure. The operation illustrated in FIG. 8 will be described with reference to the storage device 100 shown in FIG. 3.

Referring to FIG. 8, the memory unit MU corresponding to the word line WL #(K−1) is determined as the target memory unit TGT_MU. Accordingly, the controller 120 of the storage device 100 may program the target dummy data TGT_DUMMY into the memory unit MU corresponding to the word line WL #(K−1).

At this time, a state of each memory cell included in the memory unit MU corresponding to the word line WL #(K−1) may be one of the N program states PV_1, PV_2, . . . , PV_N−1, and PV_N, but it may not be the erase state.

Figure 9:
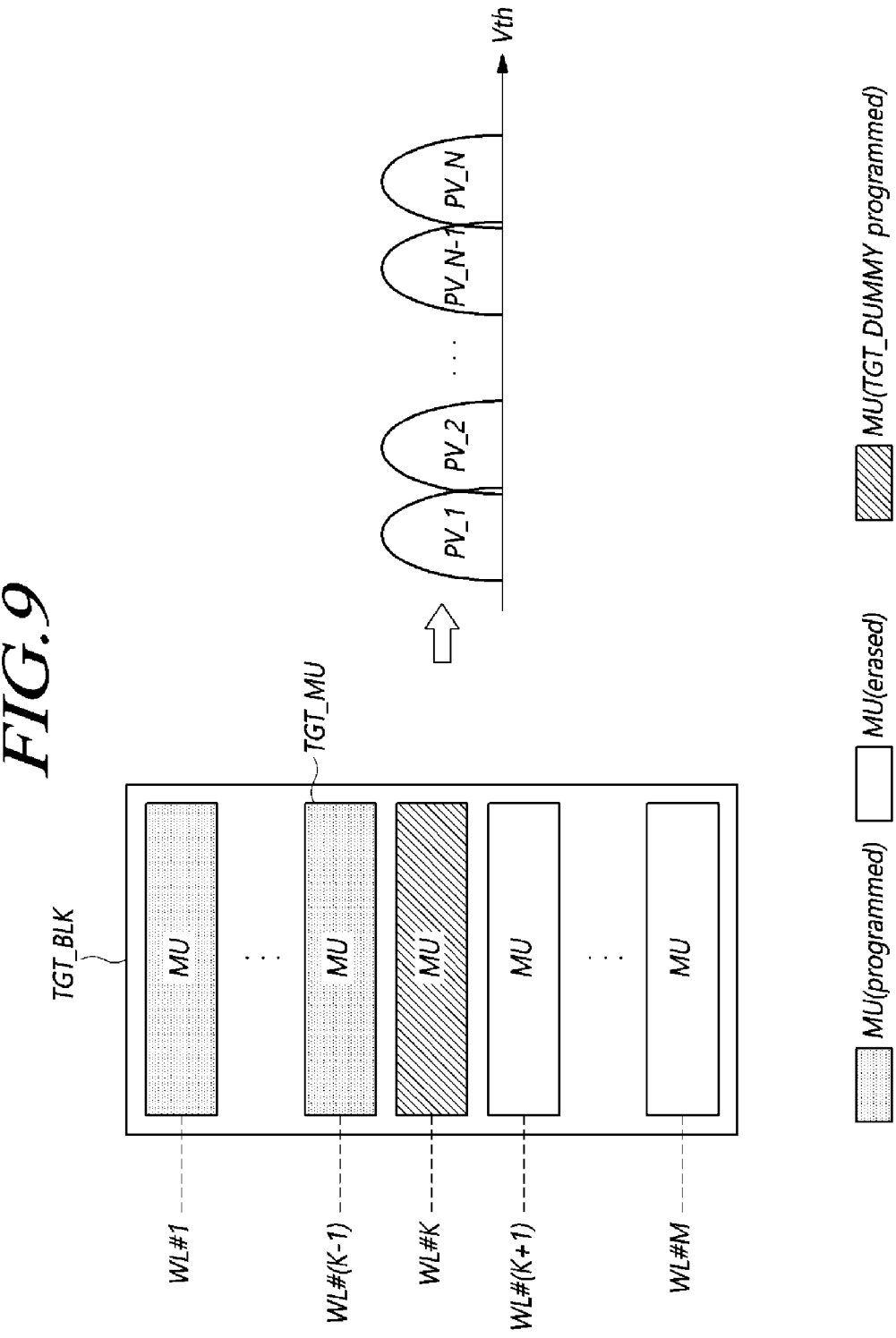
FIG. 9 illustrates an operation in which a storage device programs target dummy data into a memory unit next to a target memory unit according to an embodiment of the present disclosure.

FIG. 9 illustrates an operation in which a storage device programs target dummy data into a memory unit next to a target memory unit according to an embodiment of the present disclosure. The operation illustrated in FIG. 9 will be described with reference to the storage device 100 shown in FIG. 3.

Referring to FIG. 9, the controller 120 of the storage device 100 may program the target dummy data TGT_DUMMY into the memory unit next to the target memory unit TGT_MU. In FIG. 9, the target memory unit TGT_MU is the memory unit corresponding to the word line WL #(K−1), and the memory unit next to the target memory unit TGT_MU is the memory unit corresponding to the word line WL #(K).

In this case, the controller 120 may additionally program the target dummy data TGT_DUMMY into the memory unit corresponding to the word line WL #(K).

Meanwhile, in FIG. 9, a case where user data is programmed into the target memory unit TGT_MU is described as an example. However, the target dummy data TGT_DUMMY may be programmed into the target memory unit TGT_MU instead of the user data.

Figure 10:
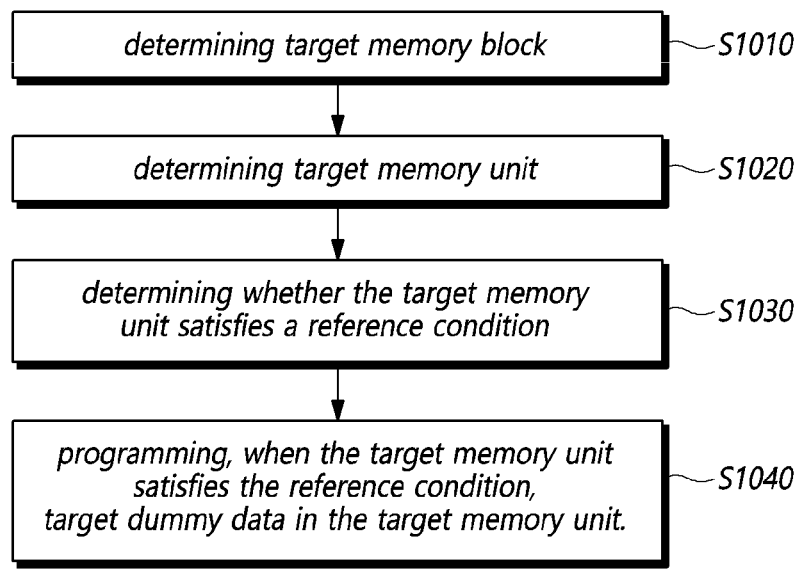
FIG. 10 illustrates an operating method of a storage device according to an embodiment of the present disclosure.

FIG. 10 illustrates an operating method of a storage device according to an embodiment of the present disclosure. The operation illustrated in FIG. 10 will be described with reference to the storage device 100 shown in FIG. 3.

Referring to FIG. 10, the operating method of the storage device 100 may include determining a target memory block TGT_BLK from among a plurality of memory blocks BLK each including a plurality of memory units MU (S1010). Each of the plurality of memory units MU included in the target memory block TGT_BLK may correspond to a corresponding one of a plurality of word lines WL and may include a plurality of memory cells MC. Each of the plurality of memory cells MC may have a erase state or one of N program states.

The operating method of the storage device 100 may further include determining a target memory unit TGT_MU from among the plurality of memory units MU included in the target memory block TGT_BLK (S1020).

For example, the operation S1020 may include i) determining a target erase memory unit TGT_ERASE_MU from among the memory units MU included in the target memory block TGT_BLK, and ii) determining a memory unit preceding the target erase memory unit TGT_ERASE_MU as the target memory unit TGT_MU. In this case, the target erase memory unit TGT_ERASE_MU may be a memory unit with the highest program priority among erase memory units included in the target memory block TGT_BLK.

The operating method of the storage device 100 may further include determining whether the target memory unit TGT_MU satisfies a reference condition (S1030). The reference condition may be considered satisfied when the following conditions are met: i) the target dummy data TGT_DUMMY has not been programmed into the target memory unit TGT_MU and ii) a program operation for the target memory unit TGT_MU has not yet been completed.

For example, the operation S1030 may determine that the target dummy data TGT_DUMMY has been programmed into the target memory unit TGT_MU when there is no memory cell in a erase state among the memory cells included in the target memory unit TGT_MU.

For example, the operation S1030 may determine that the program operation for the target memory unit TGT_MU has not yet been completed when there is no memory cell in the target program state TGT_PV, among the N program states PV_1, PV_2, . . . , PV_N−1, and PV_N, within the memory cells included in the target memory unit TGT_MU.

And the operating method of the storage device 100 may further include programming the target dummy data TGT_DUMMY into the target memory unit TGT_MU when the target memory unit TGT_MU satisfies the reference condition (S1040).

Meanwhile, the operating method of the storage device 100 may further include programming the target dummy data TGT_DUMMY into a memory unit next to the target memory unit TGT_MU.

Although the embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
a memory including a plurality of memory blocks, each of the plurality of memory blocks including a plurality of memory units, each of the plurality of memory units corresponding to a corresponding one of a plurality of word lines and including a plurality of memory cells, and each of the plurality of memory cells having an erase state or one of N program states, N being a natural number; and
a controller configured to:
determine a target memory block from among the plurality of memory blocks,
determine a target memory unit from among the plurality of memory units included in the target memory block, and
program target dummy data into the target memory unit when it is determined that the target dummy data is not programmed into the target memory unit and when a program operation for the target memory unit is not completed,
wherein the controller is configured to:
determine a target erase memory unit having a highest program priority from among erased memory units included in the target memory block, and
determine a memory unit preceding the target erase memory unit as the target memory unit.

2. The storage device according to claim 1, wherein the target memory block is a memory block in which a recovery operation for Sudden Power Off (SPO) is executed.

3. The storage device according to claim 1, wherein the controller is configured to:
determine that the target dummy data is programmed into the target memory unit when there is no memory cell in an erase state among memory cells included in the target memory unit.

4. The storage device according to claim 3, wherein the controller is configured to:
determine that the program operation for the target memory unit is not yet completed when there is no memory cell in a target program state among the N program states, among the memory cells included in the target memory unit.

5. The storage device according to claim 4, wherein the target program state corresponds to a program state, among the N program states, having a highest threshold voltage level.

6. The storage device according to claim 1, wherein the controller is configured to:
program the target dummy data into a memory unit next to the target memory unit.

7. A method of operating a storage device, the method comprising:
determining a target memory block from among a plurality of memory blocks, each including a plurality of memory units;
determining a target memory unit from among the plurality of memory units included in the target memory block;
determining whether the target memory unit satisfies a reference condition; and
programming target dummy data into the target memory unit when the target memory unit satisfies the reference condition;
wherein each of the plurality of memory units included in the target memory block corresponds to a corresponding one of a plurality of word lines and includes a plurality of memory cells,
wherein each of the plurality of memory cells has an erase state or one of N program states, N being a natural number, and
wherein the reference condition is satisfied when the target dummy data is not programmed into the target memory unit and when a program operation for the target memory unit is not yet completed,
wherein the determining a target memory unit comprises:
determining a target erase memory unit from among the plurality of memory units included in the target memory block, and
determining a memory unit preceding the target erase memory unit as the target memory unit,
wherein the target erase memory unit is a memory unit having a highest program priority among erased memory units included in the target memory block.

8. The method according to claim 7, wherein the determining a target memory block comprises:

determining, as the target memory block, a memory block in which a recovery operation for Sudden Power Off (SPO) is executed.

9. The method according to claim 7, wherein the determining whether the target memory unit satisfies a reference condition comprises:

determining that the target dummy data is programmed into the target memory unit when there is no memory cell in an erase state among memory cells included in the target memory unit.

10. The method according to claim 9, wherein the determining whether the target memory unit satisfies a reference condition further comprises:

determining that the program operation for the target memory unit is not yet completed when there is no memory cell in a target program state among the N program states, among the memory cells included in the target memory unit.

11. The method according to claim 7, further comprising:

programming the target dummy data into a memory unit next to the target memory unit.

12. A controller comprising:

a working memory storing target dummy data; and a processor configured to execute operations instructing:

determining a target memory block from among a plurality of memory blocks, each including a plurality of memory units, determining a target memory unit that is the last programmed memory unit among the plurality of memory units included in the target memory block before Sudden Power Off (SPO) occurs, and programming target dummy data into the target memory unit when the target dummy data is not programmed into the target memory unit and when a program operation for the target memory unit is not yet completed, wherein the processor is configured to:

determine a target erase memory unit having a highest program priority from among erased memory units included in the target memory block, and determine a memory unit preceding the target erase memory unit as the target memory unit.

13. The controller according to claim 12, wherein the determining a target memory block comprises:

determining, as the target memory block, a memory block in which a recovery operation for Sudden Power Off (SPO) is executed.

* * * * *